UNITED STATES PATENT OFFICE.

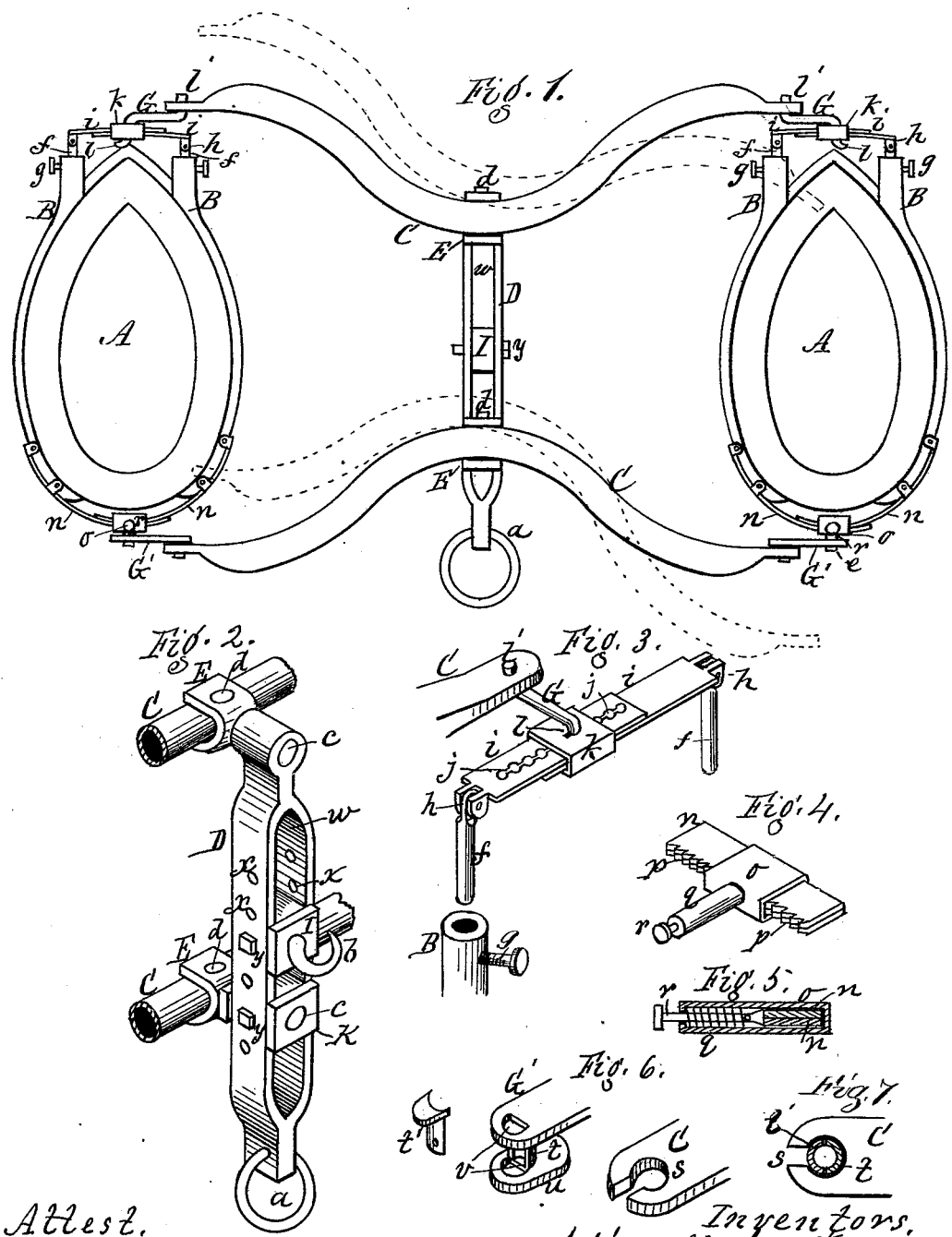

ARTHUR W. LAWTON AND ALBERT L. LAWTON, OF ROCHESTER, N. Y.

IMPROVEMENT IN HARNESS.

Specification forming part of Letters Patent No. 221,413, dated November 11, 1879; application filed December 16, 1878.

*To all whom it may concern:*

Be it known that we, ARTHUR W. LAWTON and ALBERT L. LAWTON, both of Rochester, in the county of Monroe and State of New York, have invented certain new and useful Improvements in Harness; and we do hereby declare that the following is a full, clear, and exact description of the same, reference being had to the accompanying drawings, in which—

Figure 1 is a front elevation of our improved harness. Fig. 2 is a perspective view of the clevis-bar and its attachments. Figs. 3, 4, 5, 6, and 7 are detail views.

Our improvements relate more particularly to work-harness; and the invention consists in the construction and arrangement hereinafter more fully described.

A A represent the collars of a double harness, which are of ordinary construction. B B are the hames which fit thereon. C C are two draft bars or equalizers, with which the collars are connected, which bars extend from side to side, as shown in Fig. 1. They are connected in the center by a vertical clevis, D, in the bottom of which is a ring, $a$, for the pole or shaft of a wagon to pass through, and above which is a draft-hook, $b$, with which is connected a chain or other connection, by which the draft is applied.

The draft-bars C C are preferably of metal, tubular in form, and of the curved shape shown, curving toward the center and backward; but they may be made of wood or other material, if desired. By thus curving the draft-bars inward and backward they lie in better position to act upon the load, and produce less strain upon the horses than when they extend straight across.

The clevis-bar D is pivoted at $c$ $c$, at its ends, to clips E E, and these clips, in turn, are pivoted at $d$ $d$ to the draft-bars. The two sets of pivots are at right angles to each other. By this means the draft-bars can vibrate vertically, as shown by dotted lines, Fig. 1, so that the horses can work easily on inclined or uneven ground, or forward and back to suit the motions of the horses. Under such vertical vibration of the draft-bars the collars always stand in a true vertical line, whatever may be the inclination of the bars, so that no undue strain or twist comes upon the horse's neck or shoulder. This is owing to the double-jointed connection of the clevis-bar with the draft-bars, allowing each to move in opposite directions. The clips before described also allow the draft-bars to vibrate forward and backward horizontally, so as to allow the natural motion of the horses and allow one horse to move in advance of the other, while at the same time the clevis-bar is allowed to adapt itself to the line of draft.

The tops of the hames B B are made tubular, and in these tubes rest shanks $f$ $f$, which are secured at any adjustment therein by set-screws $g$ $g$, which pass through the ends of the hames. To the tops of these shanks are pivoted, at $h$ $h$, cross-plates $i$ $i$, of metal, which slide past each other through clasps $k$ $k$. Through the cross-plates are made a series of coincident key-hole slots, $j$ $j$, and also through the clasps a single similar key-hole slot. Through these slots, on each side, passes the bent end $l$ of a double-cranked arm, G, the other bent end, $l'$, of which passes up through a hole in the end of the draft-bar C. By this means the tops of the hames are connected with the upper draft-bar. By sliding the cross-plates $i$ $i$ forward or back over each other and entering the crank end of arm G through the corresponding slots the hames may be taken up or let out at pleasure.

The shanks $f$ $f$, by being adjusted higher or lower in the ends of the hames, allow the hames to be lengthened or shortened, as necessity may require.

The pivoting of the cross-plates $i$ $i$ to the tops of the shanks $f$ $f$ enables the cross-plates to always lie flat and in contact with each other.

To the bottoms of the hames are riveted, or otherwise attached, other cross plates or straps, $n$ $n$, also overlapping each other and passing through clasps $o$ $o$. The outer edges of the plates have ratchet-teeth or serrations $p$ $p$, and the clasp has an outwardly-projecting tube or barrel, $q$, in which rests a sharp-edged headed pin, $r$, the sharp edge of which engages with the ratchet-teeth and holds the plates together at any desired adjustment. The pin is preferably pressed in by a coiled or other spring, to hold its engagement with the ratchet. This arrangement allows expansion and contraction of the bottom of the hames, and also allows the hames to be disengaged for taking off and putting on the collar. Ordinarily the collar, with the hames attached, may be put on and taken off over the horse's head; but sometimes it is necessary to disengage the hames.

To the bottom of the clasp $o$, or its barrel $q$, a crank-arm, $G'$, is pivoted at $e$, its opposite crank end being jointed to the end of the lower draft-bar, C. This crank-arm is the same length as and corresponds with the crank-arm G at the top.

The ends of the lower draft-bar C, in which the crank-pins of the lower crank-arms, $G'$ $G'$, fit, are provided with key-hole slots $s$ $s$, the outer ends of which are narrow and the inner ends wide, forming circular sockets to receive and hold the said crank-pins. These crank-pins consist each of two halves, $t$ $t'$, the first being stiff and rigid with the crank-arm $G'$, and provided with a horizontal base-flange, $u$, provided with a socket or hole, $r$, and the other half being loose and separate and forming a locking-piece. In connecting and disconnecting the parts the half-crank $t$ slips through the narrow part of slot $s$, the flange $u$ passing under the end of the draft-bar. When in place in the wide part of the slot the other half, $t'$, forming the locking-piece, is inserted and moved vertically, passing through the holes $r$ and completing the circular bearing resting in and filling the socket. This device enables the collars and hames to be engaged with and disengaged from the lower draft-bar.

The clevis-bar D is formed with a guideway, $w$, in which are located two sliding blocks, I and K, the former carrying the draft-hook $b$, and the latter the clip E, which is pivoted to the lower draft-bar C. The sides of the clevis-bar are provided with a set of adjusting-holes, $x$ $x$, through which and the blocks I K pass pins $y$ $y$, by which said blocks are retained in position. The blocks can be adjusted higher and lower by shifting the pins to different holes. By this means the draft-bars may be adjusted apart to suit the corresponding adjustment of the hames, and the draft-hook may be correspondingly adjusted to meet the requirements of the case.

The harness above described is particularly useful as a plow-harness, and greatly facilitates plowing among fruit-trees, &c.; but it is also adapted to ordinary work with two horses.

Having thus described our invention, we do not claim a neck-yoke consisting of collars connected with cross-bars; but

We claim—

1. In combination with the draft-bars C C and clevis-bar D, the independent blocks I and K, carrying, respectively, the draft-hook and the lower draft-bar, and capable of adjustment up and down in the clevis-bar by means of the pins $y$ $y$ and adjusting-holes $x$ $x$, as shown and described, and for the purpose specified.

2. In combination with the draft-bars C C and collars A A, the hames B B, made tubular at the top, the shanks $f f$, resting in the tubes and adjustable vertically by means of set-screws, and the pivoted cross plates or straps $i$ $i$, attached to the said shanks, as shown and described, and for the purpose specified.

3. The combination, with the draft-bars C C and collars A A, of the shanks $f f$, the pivoted cross plates or straps $i$ $i$, provided with key-hole slots $j j$, the clasp $k$, and the crank-arm G, having its crank end passing through the cross-plates and clasp to secure the parts together, as herein shown and described.

4. The combination, with the draft-bars C C and collars A A, of the cross plates or straps $n$ $n$, provided with ratchet-teeth at their edges, the clasp $o$, the barrel $q$, the spring-pin $r$, and the crank-arm $G'$, connecting said parts with the end of the lower draft-bar, as shown and described, and for the purpose specified.

5. The combination, with the open slotted end of the draft-bar C, of the half pins or pivots $t$ $t'$, one of which is rigid with the crank-arm $G'$, and is provided with a socketed flange, $u$, and the other is independent and forms a locking-piece to secure the pivot in its socket, as herein shown and described.

In witnesss whereof we have hereunto signed our names in the presence of two subscribing witnesses.

ARTHUR W. LAWTON.
ALBERT L. LAWTON.

Witnesses:
R. F. OSGOOD,
JACOB SPAHN.